United States Patent
Yamada

(10) Patent No.: US 10,490,231 B2
(45) Date of Patent: Nov. 26, 2019

(54) BASE UNIT AND DISK DRIVE APPARATUS

(71) Applicant: Nidec Corporation, Kyoto (JP)

(72) Inventor: Hiroki Yamada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/125,802

(22) Filed: Sep. 10, 2018

(65) Prior Publication Data

US 2019/0096443 A1 Mar. 28, 2019

(30) Foreign Application Priority Data

Sep. 25, 2017 (JP) ................. 2017-183314

(51) Int. Cl.
  *G11B 33/14* (2006.01)
  *H02K 5/10* (2006.01)
  (Continued)

(52) U.S. Cl.
  CPC .......... *G11B 33/1453* (2013.01); *G11B 33/14* (2013.01); *G11B 33/1446* (2013.01);
  (Continued)

(58) Field of Classification Search
  None
  See application file for complete search history.

(56) References Cited

U.S. PATENT DOCUMENTS 6,661,603 B1 * 12/2003 Watkins ............... G11B 33/121
  360/99.19
7,012,191 B1 * 3/2006 Watanabe ............ G11B 33/121
  174/50

(Continued)

FOREIGN PATENT DOCUMENTS

CN 104449218 A * 3/2015
JP 02278592 A * 11/1990
(Continued)

*Primary Examiner* — William J Klimowicz
(74) *Attorney, Agent, or Firm* — Keating & Bennett, LLP

(57) ABSTRACT

Provided is a base unit for use in a disk drive apparatus and to be attached to a cover portion to define an enclosed space to be filled with a gas having a density lower than that of air. The base unit includes a base portion arranged to extend radially and support a motor capable of rotating about a central axis extending in a vertical direction; and a lateral wall portion arranged to extend axially upward from an edge portion of the base portion. The base portion includes a part accommodating portion defined by a through hole arranged to pass through the base portion in an axial direction, and arranged to accommodate at least a portion of a predetermined part; and a seal member arranged to close an end portion of the through hole on one axial side. The base portion and the lateral wall portion include a base made of a metal; a coating portion formed by electrocoating a surface of the base with at least a resin; and at least one exposed portion where the surface of the base is exposed. The at least one exposed portion is arranged in at least one of a predetermined first region and a second region. The first region lies on an axially upper end portion of the lateral wall portion, the axially upper end portion being opposite to the cover portion. The second region lies on an outer surface of the base portion, and is arranged to extend outward from an edge of the part accommodating portion so as to have a predetermined width.

16 Claims, 5 Drawing Sheets

(51) Int. Cl.
*H02K 7/08* (2006.01)
*H02K 21/22* (2006.01)

(52) U.S. Cl.
CPC .......... *G11B 33/1466* (2013.01); *H02K 5/10* (2013.01); *H02K 7/088* (2013.01); *H02K 21/22* (2013.01)

(56) References Cited

U.S. PATENT DOCUMENTS

| | | | | |
|---|---|---|---|---|
| 7,105,963 | B2 * | 9/2006 | Ito | H02K 3/522 |
| | | | | 310/67 R |
| 7,209,317 | B1 * | 4/2007 | Berding | G11B 25/043 |
| | | | | 360/97.11 |
| 9,330,728 | B1 * | 5/2016 | Nakamura | G11B 33/027 |
| 9,336,817 | B1 * | 5/2016 | Hirasawa | G11B 19/2009 |
| 2006/0138886 | A1 * | 6/2006 | Ito | H02K 3/522 |
| | | | | 310/89 |
| 2006/0268453 | A1 * | 11/2006 | Watanabe | G11B 19/2009 |
| | | | | 360/99.08 |
| 2008/0020185 | A1 | 1/2008 | Macatangay et al. | |
| 2009/0316299 | A1 * | 12/2009 | Tashiro | G11B 33/1466 |
| | | | | 360/97.12 |
| 2011/0122530 | A1 * | 5/2011 | Sekii | H02K 3/50 |
| | | | | 360/99.08 |
| 2011/0134566 | A1 * | 6/2011 | Sekii | G11B 19/2009 |
| | | | | 360/99.08 |
| 2011/0249362 | A1 * | 10/2011 | Saichi | G11B 19/2009 |
| | | | | 360/99.08 |
| 2014/0042844 | A1 * | 2/2014 | Sato | H02K 5/225 |
| | | | | 310/71 |
| 2017/0221527 | A1 * | 8/2017 | Choe | G11B 33/1466 |
| 2018/0374514 | A1 * | 12/2018 | Akagi | G11B 33/148 |

FOREIGN PATENT DOCUMENTS

| | | | | |
|---|---|---|---|---|
| JP | 11025653 | A * | 1/1999 | |
| JP | 11260050 | A * | 9/1999 | |
| JP | 2008-27540 | A | 2/2008 | |
| JP | 4343100 | B2 * | 10/2009 | ............. H02K 3/522 |

* cited by examiner

BASE UNIT AND DISK DRIVE APPARATUS

CROSS REFERENCE TO RELATED APPLICATIONS

This application claims the benefit of priority to Japanese Patent Application No. 2017-183314 filed on Sep. 25, 2017. The entire contents of this application are hereby incorporated herein by reference.

BACKGROUND OF THE INVENTION

1. Field of the Invention

The present invention relates to a base unit and a disk drive apparatus.

2. Description of the Related Art

A known base plate for use in a disk drive apparatus is described in JP-A 2008-027540. This base plate is defined by a substantially plate-shaped member made of a metal, and includes a first surface including a recessed portion in which a disk-shaped recording medium (i.e., a hard disk), a motor, a magnetic head, and an actuator therefor are accommodated, and a second surface to which a control circuit board is fixed. A resin coating layer is defined on a surface of the base plate through electrocoating.

The base plate includes a sealing surface to be tightly covered with a cover plate, and arranged around the recessed portion, that is, along four sides of the base plate, which is substantially rectangular in a plan view, and screw holes used for screwing the cover plate are defined in the base plate at four corners and at two substantially middle positions along long sides. Fixing screws are screwed into the screw holes with a seal member (e.g., a rubber packing) being held between the sealing surface of the base plate and the cover plate. As a result, the recessed portion defined in the first surface of the base plate defines an enclosed space surrounded by the base plate and the cover plate.

The resin coating layer is defined on the above-described known base plate. Resins are generally more hygroscopic than metals. Accordingly, moisture outside of the enclosed space surrounded by the base plate and the cover plate may be absorbed by the resin coating layer and travel through the resin coating layer to enter into the enclosed space. Therefore, the moisture, entering into the enclosed space, may be attached to the disk-shaped recording medium, the magnetic head, or the like, which may result in reduced reliability of the base plate.

SUMMARY OF THE INVENTION

The present invention has been conceived to provide a base unit and a disk drive apparatus which are able to achieve an improvement in reliability.

A base unit according to a preferred embodiment of the present invention is a base unit for use in a disk drive apparatus and to be attached to a cover portion to define an enclosed space to be filled with a gas having a density lower than that of air. The base unit includes a base portion arranged to extend radially and support a motor capable of rotating about a central axis extending in a vertical direction; and a lateral wall portion arranged to extend axially upward from an edge portion of the base portion. The base portion includes a part accommodating portion defined by a through hole arranged to pass through the base portion in an axial direction, and arranged to accommodate at least a portion of a predetermined part; and a seal member arranged to close an end portion of the through hole on one axial side. The base portion and the lateral wall portion include a base made of a metal; a coating portion formed by electrocoating a surface of the base with at least a resin; and at least one exposed portion where the surface of the base is exposed. The at least one exposed portion is arranged in at least one of a predetermined first region and a second region, the first region lying on an axially upper end portion of the lateral wall portion, the axially upper end portion being opposite to the cover portion, the second region lying on an outer surface of the base portion, and arranged to extend outward from an edge of the part accommodating portion so as to have a predetermined width.

A disk drive apparatus according to a preferred embodiment of the present invention is a disk drive apparatus including the base unit having the above-described structure, the base unit having an opening portion lying on an upper side of the base unit; a cover portion arranged to cover the opening portion of the base unit; a gasket held between an axially lower surface of the cover portion and an axially upper end surface of the lateral wall portion; a motor including a bearing mechanism arranged on the base portion, and a rotating portion supported through the bearing mechanism to be rotatable about the central axis; and an access portion arranged to perform at least one of reading and writing of information from or to a magnetic disk supported by the rotating portion. The motor and the access portion are accommodated in the enclosed space. The cover portion includes a base made of a metal, a coating portion formed by electrocoating a surface of the base with at least a resin, and an exposed portion where the surface of the base is exposed. The exposed portion of the cover portion is arranged to cover an area radially outside of a point of contact between the cover portion and the gasket in a region of the cover portion opposite to the upper end surface of the lateral wall portion.

The base unit and the disk drive apparatus according to the above preferred embodiments of the present invention are able to achieve an improvement in reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a cover portion is arranged with respect to a base portion is an upper side, and the shape of each member or portion and relative positions of different members or portions will be described based on the above assumptions. It should be noted, however, that the above definitions of the vertical direction and the upper and lower sides are not meant to restrict in any way the orientation of a base unit, a motor, or a disk drive apparatus according to any preferred embodiment of the present invention when in use.

It is also assumed that the term "parallel" as used herein includes both "parallel" and "substantially parallel". It is also assumed that the term "perpendicular" as used herein includes both "perpendicular" and "substantially perpendicular".

Figure 1:
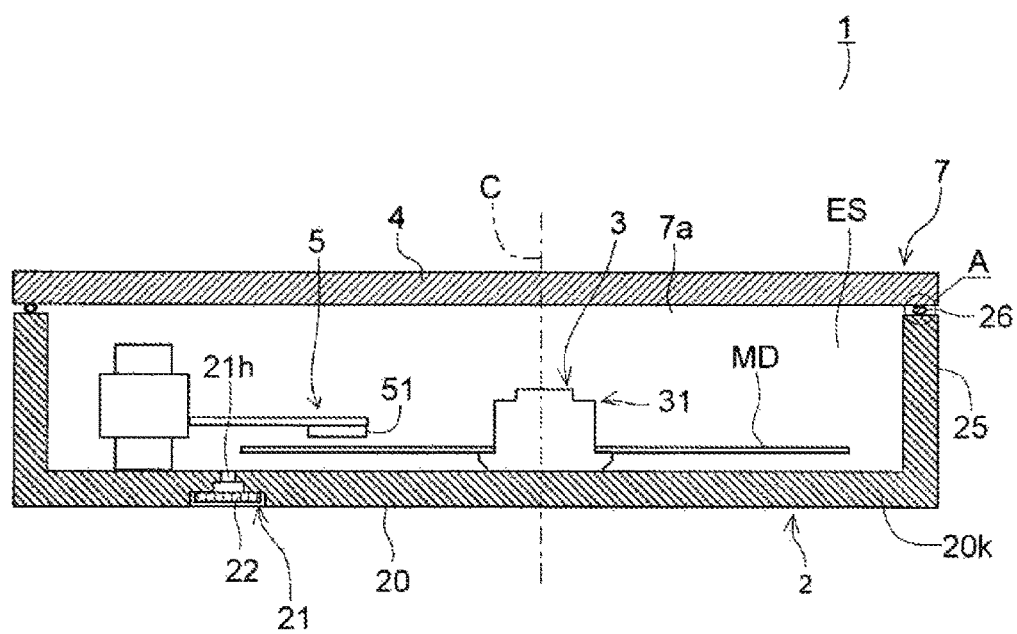
FIG. 1 is a vertical sectional view of a disk drive apparatus including a base unit according to a preferred embodiment of the present invention.
Figure 2:
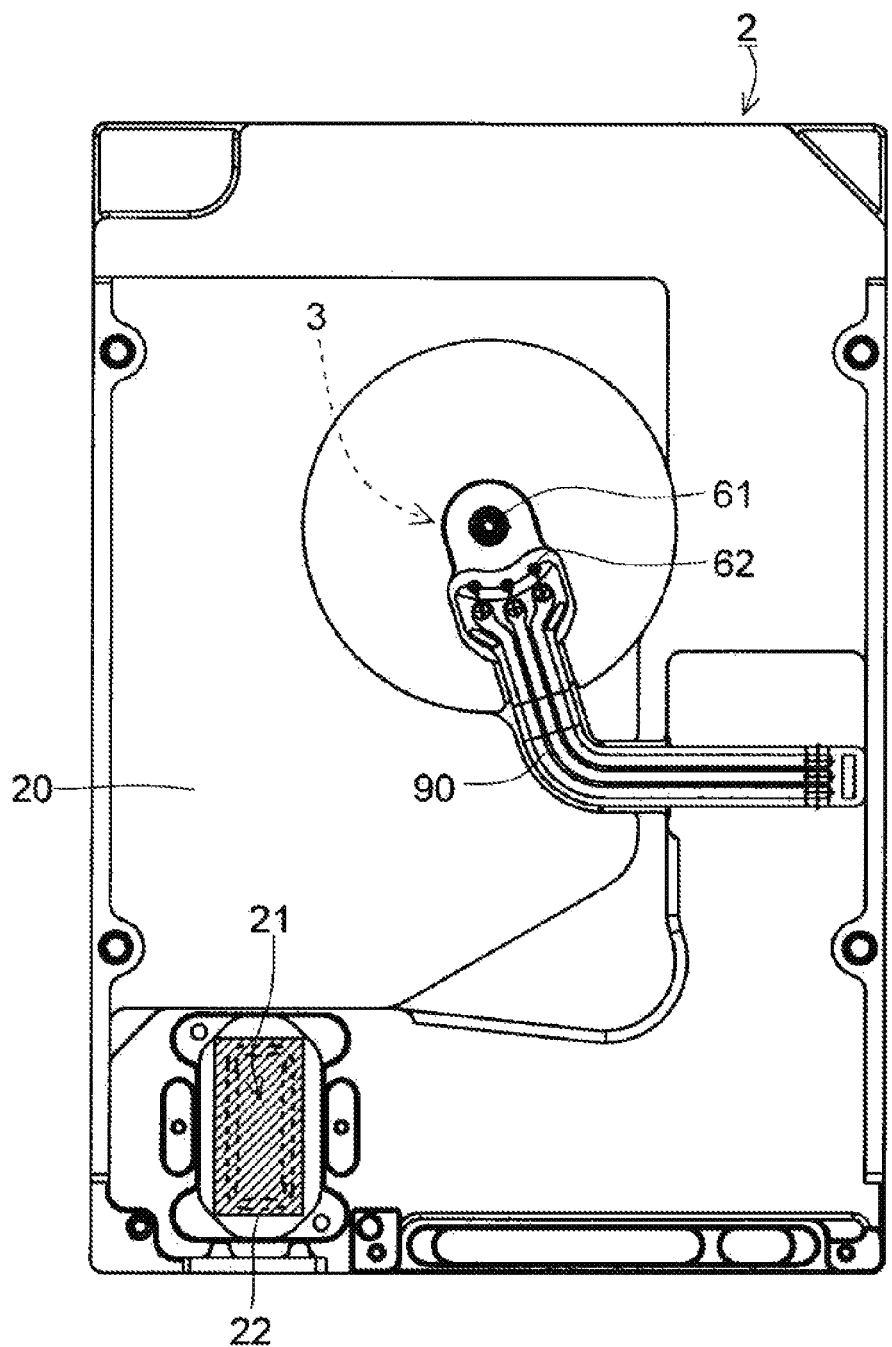
FIG. 2 is a plan view of the disk drive apparatus including the base unit according to a preferred embodiment of the present invention as viewed from below.

FIG. 1 is a vertical sectional view of a disk drive apparatus 1 including a base unit 2 according to a preferred embodiment of the present invention. FIG. 2 is a plan view of the disk drive apparatus 1 as viewed from below. The disk drive apparatus 1 is, for example, a so-called hard disk drive (HDD) apparatus, and includes a casing 7 arranged to accommodate a motor 3 and an access portion 5.

The motor 3 is arranged to be capable of rotating about a central axis C extending in the vertical direction. The access portion 5 includes a head 51, and the head 51 is arranged to move along a recording surface of a magnetic disk MD (i.e., a disk) supported by a rotating portion 31 of the motor 3. The access portion 5 is thus arranged to perform at least one of reading and writing of information from or to the magnetic disk MD.

The casing 7 includes the base unit 2 and a cover portion 4, and a section of the casing 7 perpendicular to the axial direction is substantially rectangular. The cover portion 4 is attached to the base unit 2, so that an enclosed space ES is defined inside of the casing 7. The enclosed space ES is filled with a gas having a density lower than that of air. For example, helium, hydrogen, a gas mixture of helium and hydrogen, or the like may be used as the gas with which the enclosed space ES is filled. Note that the enclosed space ES may alternatively be filled with air.

The base unit 2 includes a base portion 20 and a lateral wall portion 25. The base portion 20 is arranged to extend radially and support the motor 3, which is capable of rotating about the central axis C extending in the vertical direction. The base portion 20 is defined by a plate-shaped member being substantially rectangular when viewed in the axial direction. The lateral wall portion 25 is arranged to extend axially upward from an edge portion of the base portion 20 to surround the enclosed space ES. An axially upper end surface of the lateral wall portion 25 includes a plurality of screw holes (not shown).

The base portion 20 and the lateral wall portion 25 are defined by a single monolithic member. Note that the base portion 20 and the lateral wall portion 25 may alternatively be defined by separate members, and be made of different materials. The base portion 20 and the lateral wall portion 25 will be described in detail below.

The cover portion 4 is defined by a plate-shaped member being substantially rectangular when viewed in the axial direction, and is arranged to cover an upper opening portion 7a of the base unit 2, the upper opening portion 7a lying on the upper side of the base unit 2. In addition, an annular gasket 26 made of a resin is held between an axially lower surface of the cover portion 4 and the axially upper end surface of the lateral wall portion 25. Note that the gasket 26 may alternatively be made of a metal. An edge portion of the cover portion 4 includes a plurality of insert holes (not shown) each of which is arranged to pass therethrough in the axial direction. Screws (not shown) are inserted through the insert holes, and are screwed into the screw holes in the lateral wall portion 25, whereby the cover portion 4 is fitted to the lateral wall portion 25. The cover portion 4 is thus fixed to the base unit 2, so that the enclosed space ES is defined.

Figure 3:
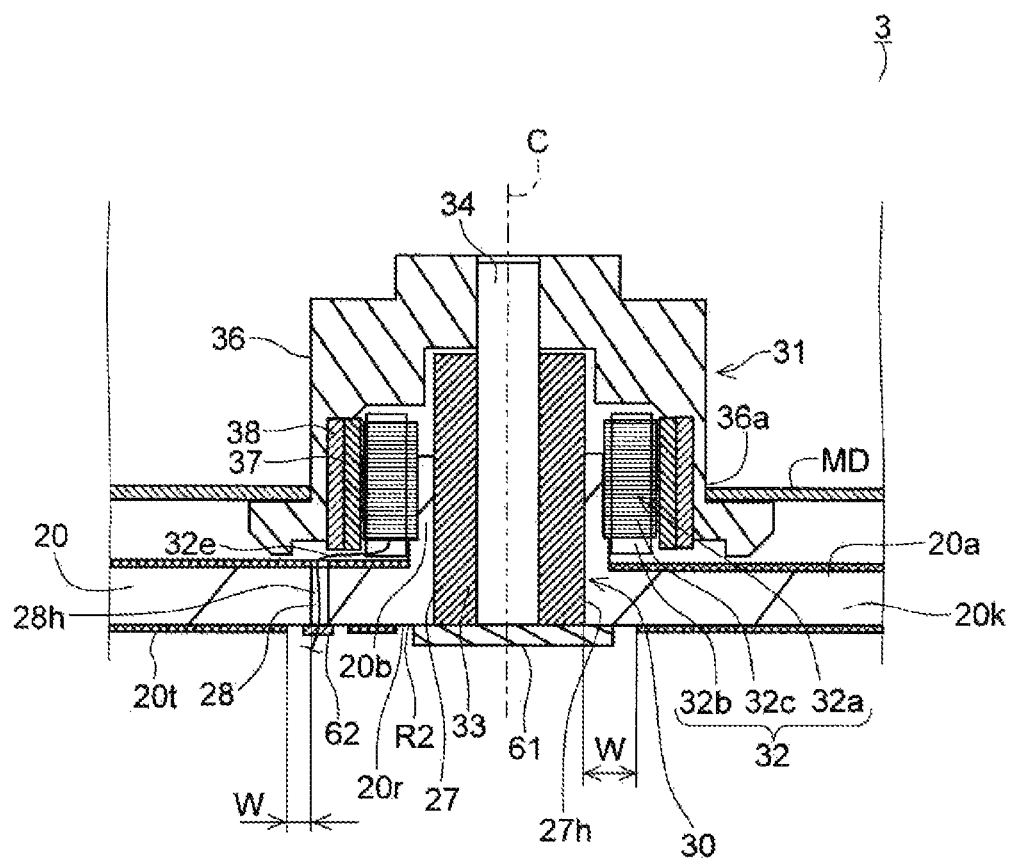
FIG. 3 is a vertical sectional view of a portion of the disk drive apparatus according to a preferred embodiment of the present invention, illustrating a motor and its vicinity.

FIG. 3 is a vertical sectional view illustrating the motor 3. The motor 3 includes a stationary portion 30 and the rotating portion 31. The stationary portion 30 is arranged to be stationary relative to the cover portion 4. The rotating portion 31 is supported to be rotatable with respect to the stationary portion 30.

The stationary portion 30 includes the base portion 20, a stator 32, and a sleeve 33.

The base portion 20 is arranged to support the stator 32 and the sleeve 33. The base portion 20 includes a bottom plate portion 20a and a cylindrical portion 20b being substantially cylindrical. The bottom plate portion 20a is arranged to extend perpendicularly to the central axis C below the rotating portion 31, the magnetic disk MD, and the access portion 5 (see FIG. 1). The lateral wall portion 25 is arranged at an edge portion of the bottom plate portion 20a. The cylindrical portion 20b is arranged to be substantially coaxial with the central axis C, about which the motor 3 is arranged to rotate, on the bottom plate portion 20a. A sleeve insertion portion 27 (i.e., a part accommodating portion), which is defined by a through hole 27h arranged to pass through the base portion 20 in the axial direction, is defined below the cylindrical portion 20b.

The stator 32 includes a stator core 32a and a plurality of coils 32b. The stator core 32a is, for example, defined by laminated steel sheets, that is, electromagnetic steel sheets, such as silicon steel sheets, placed one upon another in the axial direction. The stator core 32a is fixed to an outer circumferential surface of the cylindrical portion 20b. In addition, the stator core 32a includes a plurality of teeth 32c arranged to project radially outward. Each coil 32b is defined by a conducting wire wound around a separate one of the teeth 32c.

The bottom plate portion 20a includes a lead wire insertion portion 28 (i.e., a part accommodating portion) defined in the vicinity of one of the coils 32b. The lead wire insertion portion 28 is defined by a through hole 28h arranged to pass through the bottom plate portion 20a in the axial direction, and is arranged to accommodate at least a portion of a lead wire 32e (i.e., a predetermined part) of the coil 32b. A lower end portion of the lead wire insertion portion 28 is covered with a seal member 62. The seal member 62 includes an insert hole (not shown) through which the lead wire 32e is inserted. The through hole 28h is defined at one circumferential position, and is in the shape of a circular arc or a rectangle in a plan view.

The lead wire 32e is drawn out of the casing 7 through the lead wire insertion portion 28. After being drawn out of the casing 7, the lead wire 32e is electrically connected to a circuit board 90 (see FIG. 2). The circuit board 90 is electrically connected to an external power supply unit (not shown). In the present preferred embodiment, the circuit board 90 is a flexible printed circuit (FPC) board.

The sleeve 33 is arranged to extend in the axial direction to substantially assume a cylindrical shape around a shaft 34, which will be described below. A lower portion of the sleeve 33 is accommodated in the cylindrical portion 20b and the sleeve insertion portion 27, and is fixed to the cylindrical portion 20b and a wall surface of the sleeve insertion portion 27 through, for example, an adhesive. That is, the sleeve insertion portion 27 is defined by the through hole 27h arranged to pass through the base portion 20 in the axial direction, and is arranged to accommodate at least a portion of the sleeve 33. An inner circumferential surface of the sleeve 33 is arranged radially opposite to an outer circumferential surface of the shaft 34. In addition, an opening at a lower end of the sleeve 33 is closed by a seal member 61. At this time, the seal member 61 is arranged to close an end portion of the through hole 27h on the axially lower side (i.e., one axial side).

Each of the seal members 61 and 62 is made of, for example, a resin, and is stuck to an exposed portion 20r, which will be described below, on a lower surface (i.e., an outer surface) of the bottom plate portion 20a through, for example, a gluing agent. Note that each of the seal members 61 and 62 may alternatively be defined by a resin layer(s) and a metal layer(s) placed one upon another.

The rotating portion 31 includes the shaft 34, a hub 36, and an annular magnet 37.

The shaft 34 is arranged to extend in the axial direction on a radially inner side of the sleeve 33. An upper end portion of the shaft 34 is arranged to project upward above an upper surface of the sleeve 33. In addition, a lubricating fluid (not shown) is arranged between the shaft 34 and a combination of the sleeve 33 and the seal member 61. The shaft 34 is supported through the lubricating fluid to be rotatable with respect to the sleeve 33 and the seal member 61. A polyolester oil, a diester oil, or the like, for example, can be used as the lubricating fluid.

A bearing mechanism is defined by the sleeve 33, the seal member 61, and the lubricating fluid. The rotating portion 31 is supported to be rotatable about the central axis C through the bearing mechanism arranged on the base unit 2. That is, the base portion 20 includes the sleeve insertion portion 27 (i.e., the part accommodating portion) defined by the through hole 27h arranged to pass through the base portion 20 in the axial direction, and arranged to accommodate at least a portion of the bearing mechanism (i.e., a predetermined part).

The hub 36 is arranged to extend radially outward and axially downward from a periphery of the upper end portion of the shaft 34. An inner circumferential portion of the hub 36 is fixed to the upper end portion of the shaft 34. In addition, an annular shoulder portion 36a is arranged at a lower end portion of the hub 36, and the magnetic disk MD is supported by the shoulder portion 36a.

The magnet 37 is fixed to the hub 36 with a back yoke 38 made of a magnetic material therebetween. A radially inner surface of the magnet 37 is arranged radially opposite to each of the teeth 32c. In addition, the radially inner surface of the magnet 37 includes north and south poles arranged to alternate with each other in a circumferential direction.

In the motor 3 having the above-described structure, once electric drive currents are supplied to the coils 32b through the circuit board 90 (see FIG. 2), radial magnetic flux is generated around each of the teeth 32c of the stator core 32a. Then, interaction between the magnetic flux of the teeth 32c and magnetic flux of the magnet 37 produces a circumferential torque, so that the rotating portion 31 is caused to rotate about the central axis C with respect to the stationary portion 30. The magnetic disk MD supported by the shoulder portion 36a of the hub 36 is caused to rotate about the central axis C together with the rotating portion 31.

Figure 4:
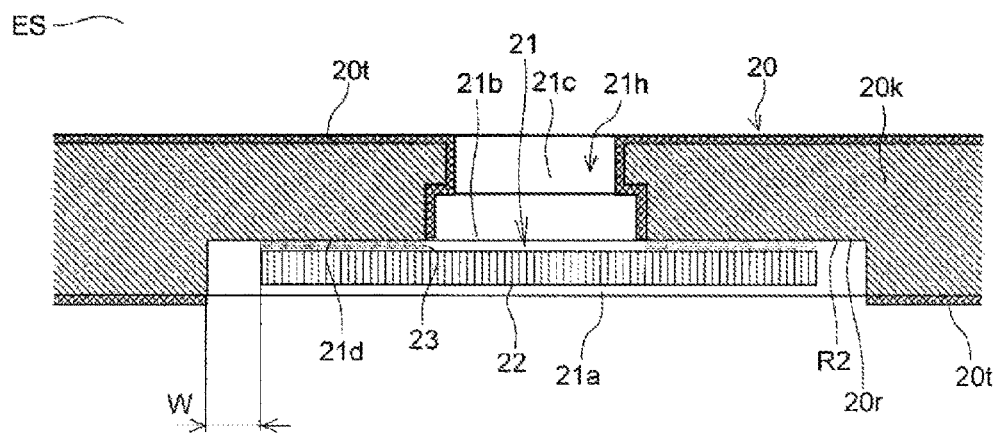
FIG. 4 is a vertical sectional view of a portion of the base unit according to a preferred embodiment of the present invention, illustrating a connector accommodating portion and its vicinity.

FIG. 4 is a vertical sectional view of a portion of the base portion 20, illustrating a connector accommodating portion 21 and its vicinity. The base portion 20 includes the connector accommodating portion 21 (i.e., a part accommodating portion), which is defined by a through hole 21h arranged to pass through the base portion 20 in the axial direction, and arranged to accommodate a connector 22. The connector accommodating portion 21 includes a lower space portion 21a, a middle space portion 21b, and an upper space portion 21c arranged in the order named from bottom to top. A cross-sectional area of the lower space portion 21a perpendicular to the axial direction is arranged to be greater than a cross-sectional area of each of the middle space portion 21b and the upper space portion 21c perpendicular to the axial direction. The cross-sectional area of the upper space portion 21c perpendicular to the axial direction is arranged to be smaller than the cross-sectional area of each of the middle space portion 21b and the lower space portion 21a perpendicular to the axial direction. In addition, the lower space portion 21a, the middle space portion 21b, and the upper space portion 21c are arranged to have substantially the same axial dimension.

The connector 22 is arranged in the lower space portion 21a. The connector 22 is adhered to an upper surface 21d of the lower space portion 21a through an adhesive 23. A portion of a wire (not shown) electrically connected to an upper surface of the connector 22 is accommodated in the middle space portion 21b and the upper space portion 21c. The wire is drawn out onto an upper surface (i.e., an inner surface) of the base portion 20 through the upper space portion 21c to be arranged on the base portion 20, and is electrically connected to, for example, the access portion 5.

The connector 22 is arranged to close an axially lower end portion of the through hole 21h by being adhered to the upper surface 21d of the lower space portion 21a. That is, the connector 22 has a function similar to that of each of the seal members 61 and 62. Note that the connector 22 may alternatively be arranged in the upper space portion 21c. In this case, the cross-sectional area of the upper space portion 21c perpendicular to the axial direction is arranged to be greater than the cross-sectional area of each of the middle space portion 21b and the lower space portion 21a perpendicular to the axial direction. In addition, in this case, the cross-sectional area of the lower space portion 21a perpendicular to the axial direction is arranged to be smaller than the cross-sectional area of each of the middle space portion 21b and the upper space portion 21c perpendicular to the axial direction.

Figure 5:
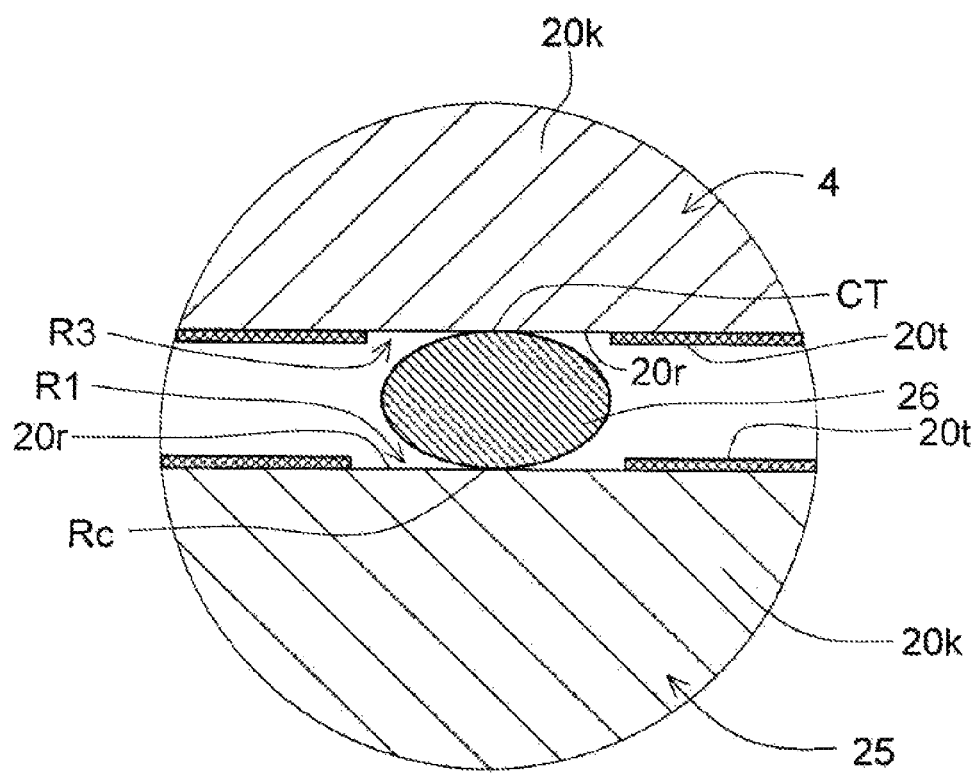
FIG. 5 is a detailed diagram illustrating area A in FIG. 1.

FIG. 5 is a detailed diagram illustrating area A in FIG. 1. The base portion 20 (see FIGS. 3 and 4) and the lateral wall portion 25 include a base 20k made of a metal, a coating portion 20t formed by electrocoating a surface of the base 20k with at least a resin, and exposed portions 20r where the surface of the base 20k is exposed. Here, the "surface of the base 20k" includes not only a surface (i.e., an outer surface) of the base 20k which faces outwardly of the casing 7, but also a surface (i.e., an inner surface) of the base 20k which faces the enclosed space ES.

The base 20k is made of, for example, aluminum or stainless steel. The coating portion 20t is arranged to have a layer thickness of about 50 μm, and a material of the coating portion 20t includes, for example, an epoxy resin and kaolin clay. Thus, the coating portion 20t can be easily formed. The coating portion 20t contributes to preventing impurities, such as, for example, particles of the metal of the base 20k, from being scattered in the enclosed space ES, thus improving the level of cleanliness in the enclosed space ES. In addition, the base unit 2 is thus able to achieve improvements in insulation and corrosion resistance.

In addition, the cover portion 4 also includes a base 20k, a coating portion 20t, and an exposed portion 20r. The coating portion 20t formed in the cover portion 4 leads to an additional improvement in the level of cleanliness in the enclosed space ES.

The exposed portions 20r are arranged in a predetermined first region R1 (see FIG. 5) on an axially upper end portion of the lateral wall portion 25, the axially upper end portion being opposite to the cover portion 4, and second regions R2 (see FIGS. 3 and 4) on a lower surface (i.e., an outer surface) of the base portion 20. The second regions R2 are arranged to extend outward from edges of the sleeve insertion portion 27, the lead wire insertion portion 28, and the connector accommodating portion 21, respectively, so as to have a predetermined width W.

As described above, the base unit 2 is used in the disk drive apparatus 1, and is to be attached to the cover portion 4 to define the enclosed space ES to be filled with the gas having a density lower than that of air. The base unit 2 includes the base portion 20 arranged to extend radially and support the motor 3 capable of rotating about the central axis C extending in the vertical direction, and the lateral wall portion 25 arranged to extend axially upward from the edge portion of the base portion 20. The base portion 20 includes the sleeve insertion portion 27 (i.e., the part accommodating portion) defined by the through hole 27h arranged to pass through the base portion 20 in the axial direction, and arranged to accommodate at least a portion of the bearing mechanism (i.e., the predetermined part); and the seal member 61 arranged to close the end portion of the through hole 27h on one axial side. The base portion 20 and the lateral wall portion 25 include the base 20k made of the metal, the coating portion 20t formed by electrocoating the surface of the base 20k with at least the resin, and the exposed portions 20r where the surface of the base 20k is exposed. The exposed portions 20r are arranged in the predetermined first region R1 on the axially upper end portion of the lateral wall portion 25, the axially upper end portion being opposite to the cover portion 4, and the second regions R2 on the lower surface (i.e., the outer surface) of the base portion 20. One of the second regions R2 is arranged to extend outward from the edge of the sleeve insertion portion 27 so as to have the predetermined width W.

Thus, the coating portion 20t on the surface of the base 20k is divided by each exposed portion 20r. As a result, moisture absorbed by the coating portion 20t outside of the enclosed space ES and traveling in the coating portion 20t is blocked by the exposed portion 20r. This reduces the likelihood that moisture outside of the enclosed space ES will enter into the enclosed space ES through the coating portion 20t. This in turn reduces the likelihood that the moisture will be attached to the magnetic disk MD, the head 51, or the like in the enclosed space ES, and leads to improved reliability of the base unit 2.

In addition, it may be sufficient if the exposed portions 20r are arranged in the first and second regions R1 and R2, and the exposed portion 20r does not need to be arranged over a wide area on the surface of the base 20k which faces the enclosed space ES. Therefore, the arrangement of the exposed portions 20r in the base portion 20 and the lateral wall portion 25 does not cause a significant reduction in the level of cleanliness in the enclosed space ES. In addition, since the coating portion 20t is formed by the electrocoating, a reduction in a production cost of the base unit 2 can be achieved compared to the case where a relatively expensive nickel plating process is performed on the base 20k.

The greatest amount of moisture enters into the enclosed space ES along a path passing through the coating portion 20t of all paths along which moisture can enter into the enclosed space ES. Meanwhile, when the base unit 2 includes no exposed portion 20r, the proportion of moisture that enters into the enclosed space ES through any of the seal members 61 and 62 and the gasket 26 to all moisture that enters into the enclosed space ES is small. Therefore, even if each of the seal members 61 and 62 and the gasket 26 is made of the resin in the present preferred embodiment, the arrangement of the exposed portions 20r in the base unit 2 can prevent an entry of a relatively high proportion of the moisture into the enclosed space ES.

Note that, although each of the seal members 61 and 62 is arranged to close the end portion of a corresponding one of the through holes 27h and 28h on the axially lower side in the present preferred embodiment, end portions thereof on an axially upper side may alternatively be closed thereby. That is, it may be sufficient if each of the seal members 61 and 62 is arranged to close the end portion of the corresponding one of the through holes 27h and 28h on one axial side.

Referring to FIG. 5, the exposed portion 20r in the first region R1 is arranged to cover an area radially outside of a region Rc of contact between the gasket 26 and the lateral wall portion 25. This reduces the likelihood that the moisture absorbed by the coating portion 20t outside of the enclosed space ES will enter into the enclosed space ES through the upper opening portion 7a (see FIG. 1).

Referring to FIG. 5, the exposed portion 20r in the first region R1 is arranged to extend from an area radially inside of the contact region Rc to the area radially outside of the contact region Rc. This further reduces the likelihood that the moisture absorbed by the coating portion 20t outside of the enclosed space ES will enter into the enclosed space ES through the upper opening portion 7a (see FIG. 1).

Referring to FIG. 5, the exposed portion 20r may be arranged on both radial sides of a point CT of contact between the cover portion 4 and the gasket 26 in a region R3 of the cover portion 4 opposite to the upper end surface of the lateral wall portion 25. At this time, the exposed portion 20r of the cover portion 4 covers an area radially outside of the contact point CT. This reduces the likelihood that moisture absorbed by the coating portion 20t of the cover portion 4 outside of the enclosed space ES will enter into the enclosed space ES through the upper opening portion 7a (see FIG. 1).

Referring to FIG. 3, each of the exposed portions 20r in the second regions R2 is arranged to cover at least an area outside of an edge of a corresponding one of the seal members 61 and 62. This further reduces the likelihood that the moisture absorbed by the coating portion 20t outside of the enclosed space ES will enter into the enclosed space ES through either of the sleeve insertion portion 27 and the lead wire insertion portion 28. Note that the wording "area outside of" the edge as used here refers to an area that is outside of the edge with reference to a substantial center of a corresponding one of the through holes 27h and 28h covered by the seal members 61 and 62. Specifically, the exposed portion 20r that covers an area surrounding the seal member 61 is arranged to cover the entire surrounding area, extending all the way around the seal member 61 on a radially outer side, while the exposed portion 20r that covers an area surrounding the seal member 62 is arranged to cover not only an area radially outside of the seal member 62 but also areas radially inside of the seal member 62 and on both circumferential sides of the seal member 62.

At least a portion of the bearing mechanism (i.e., the predetermined part) of the motor 3 is accommodated in the sleeve insertion portion 27 (i.e., the part accommodating portion), and the corresponding exposed portion 20r is arranged in the corresponding second region R2 on the lower surface (i.e., the outer surface) of the base portion 20, the corresponding second region R2 extending outward from the edge of the sleeve insertion portion 27 so as to have the predetermined width W. This reduces the likelihood that moisture will enter into the enclosed space ES through the coating portion 20t while limiting an increase in a thickness (i.e., an axial dimension) of a portion of the base unit 2 on which the bearing mechanism is arranged.

At least a portion of the lead wire 32e (i.e., the predetermined part) of the coil 32b is accommodated in the lead wire insertion portion 28 (i.e., the part accommodating portion), and the corresponding exposed portion 20r is arranged in the corresponding second region R2 on the lower surface (i.e., the outer surface) of the base portion 20, the corresponding second region R2 extending outward from the edge of the lead wire insertion portion 28 so as to have the predetermined width W. This reduces the likelihood that moisture will enter into the enclosed space ES through the coating portion 20t while allowing the lead wire 32e of the coil 32b to be easily drawn out of the enclosed space ES.

The connector 22 (i.e., the predetermined part) is accommodated in the connector accommodating portion 21 (i.e., the part accommodating portion), and the corresponding exposed portion 20r is arranged in the corresponding second region R2 on the lower surface (i.e., the outer surface) of the base portion 20, the corresponding second region R2 extending outward from the edge of the connector accommodating portion 21 so as to have the predetermined width W. This reduces the likelihood that moisture will enter into the enclosed space ES through the coating portion 20t while limiting an increase in a thickness (i.e., an axial dimension) of the base unit 2 with the connector 22 being accommodated in the connector accommodating portion 21. Note that, in the present preferred embodiment, the edge of the connector accommodating portion 21 (i.e., the part accommodating portion) substantially coincides with an edge of the connector 22.

It is desirable that each exposed portion 20r is arranged to have a surface roughness Ra of 0.2 μm or more, because this will lead to improved adherence of a corresponding one of the seal members 61 and 62 and the cover portion 4 to the exposed portion 20r. Moreover, it is further desirable that each exposed portion 20r is arranged to have a surface roughness Ra of 1.6 μm or less, because this will limit a reduction in dimensional accuracy of the base unit 2.

In the present preferred embodiment, the exposed portions 20r are arranged in both the first and second regions R1 and R2. Note, however, that it may be sufficient if the exposed portion 20r is arranged in at least one of the first and second regions R1 and R2. It is desirable that the exposed portions 20r are arranged in both the first and second regions R1 and R2, because this will achieve an additional reduction in the likelihood that moisture will enter into the enclosed space ES.

In the disk drive apparatus 1 having the above-described structure, the magnetic disk MD is supported by the rotating portion 31 of the motor 3, and the rotating portion 31 rotates about the central axis C. The head 51 of the access portion 5 moves along the recording surface of the magnetic disk MD, and the access portion 5 performs at least one of the reading and the writing of information from or to the magnetic disk MD.

Here, the enclosed space ES is filled with the gas having a density lower than that of air. Accordingly, a reduction in viscous drag applied to each of the magnetic disk MD and the access portion 5 is achieved. This leads to a reduction in a windage loss of each of the magnetic disk MD and the access portion 5 while the disk drive apparatus 1 is in operation.

The motor 3 and the disk drive apparatus 1 are provided with the base unit 2. This reduces the likelihood that moisture outside of the enclosed space ES will enter into the enclosed space ES through the coating portion 20t. This in turn contributes to preventing moisture from being attached to the motor 3, the access portion 5, or the like in the enclosed space ES, and leads to improved reliability of the motor 3 and the disk drive apparatus 1.

While preferred embodiments of the present invention have been described above, it will be understood that the scope of the present invention is not limited to the above-described preferred embodiments, and that various modifications may be made to the above-described preferred embodiments without departing from the gist of the present invention. In addition, features of the above-described preferred embodiments and the modifications thereof may be combined appropriately as desired.

Preferred embodiments of the present invention are applicable to, for example, base units for use in disk drive apparatuses. Preferred embodiments of the present invention are also applicable to, for example, disk drive apparatuses including base units.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A base unit for use in a disk drive apparatus and to be attached to a cover portion to define an enclosed space to be filled with a gas having a density lower than that of air, the base unit comprising:
   a base portion that extends radially and supports a motor capable of rotating about a central axis extending in a vertical direction; and
   a lateral wall portion that extends axially upward from an edge portion of the base portion; wherein
   the base portion includes:
      a part accommodating portion defined by a through hole arranged to pass through the base portion in an axial direction, and arranged to accommodate at least a portion of a predetermined part; and
      a seal member that closes an end portion of the through hole on one axial side;
   the base portion and the lateral wall portion are made of metal;
   a surface on both of the base portion and the lateral wall portion includes a coating portion formed by electrocoating the surface with at least a resin;

the surface includes at least one exposed portion where the surface is exposed from the coating portion;

the at least one exposed portion is in at least one of a predetermined first region and a second region, the first region lying on an axially upper end portion of the lateral wall portion, the axially upper end portion being opposite to the cover portion, the second region lying on an outer surface of the base portion, and extends outward from an edge of the part accommodating portion to have a predetermined width;

a gasket is held between an axially upper end surface of the lateral wall portion and an axially lower surface of the cover portion; and one of the at least one exposed portion is in the first region, and covers an area radially outside of a region of contact between the gasket and the lateral wall portion.

2. The base unit according to claim 1, wherein the exposed portion in the first region extends from an area radially inside of the contact region to the area radially outside of the contact region.

3. The base unit according to claim 1, wherein one of the at least one exposed portion is in the second region, and covers at least an area outside of an edge of the seal member.

4. The base unit according to claim 1, wherein the predetermined part is a bearing mechanism of the motor.

5. The base unit according to claim 1, wherein the predetermined part is a lead wire of a coil of the motor.

6. The base unit according to claim 1, wherein the predetermined part is a connector electrically connected to a wire arranged on the base portion.

7. The base unit according to claim 1, wherein the at least one exposed portion has a surface roughness Ra of 0.2 μm or more.

8. The base unit according to claim 1, wherein a material of the coating portion includes an epoxy resin and kaolin clay.

9. A disk drive apparatus comprising:
the base unit of claim 1, the base unit including an opening portion lying on an upper side of the base unit;
a cover portion that covers the opening portion of the base unit;
a motor including a bearing mechanism on the base portion, and a rotating portion supported through the bearing mechanism to be rotatable about the central axis; and
an access portion that performs at least one of reading and writing of information from or to a magnetic disk supported by the rotating portion; wherein
the motor and the access portion are accommodated in the enclosed space;
the cover portion includes a base made of a metal, a cover coating portion formed by electrocoating a surface of the base with at least a resin, and a cover exposed portion where the surface of the base is exposed; and
the cover exposed portion of the cover portion covers an area radially outside of a point of contact between the cover portion and the gasket in a region of the cover portion opposite to the upper end surface of the lateral wall portion.

10. A base unit for use in a disk drive apparatus and to be attached to a cover portion to define an enclosed space to be filled with a gas having a density lower than that of air, the base unit comprising:
a base portion that extends radially and supports a motor capable of rotating about a central axis extending in a vertical direction; and
a lateral wall portion that extends axially upward from an edge portion of the base portion; wherein
the base portion includes:
a part accommodating portion defined by a through hole arranged to pass through the base portion in an axial direction, and arranged to accommodate at least a portion of a predetermined part; and
a seal member that closes an end portion of the through hole on one axial side;
the base portion and the lateral wall portion include:
a base made of a metal;
a coating portion formed by electrocoating a surface of the base with at least a resin; and
at least one exposed portion where the surface of the base is exposed;
the at least one exposed portion is in a predetermined region lying on an axially upper end portion of the lateral wall portion, the axially upper end portion being opposite to the cover portion;
a gasket is held between an axially upper end surface of the lateral wall portion and an axially lower surface of the cover portion; and
the at least one exposed portion covers an area radially outside of a region of contact between the gasket and the lateral wall portion.

11. The base unit according to claim 10, wherein
the at least one exposed portion further includes an additional predetermined region lying on an outer surface of the base portion and extending outward from an edge of the part accommodating portion to have a predetermined width.

12. The base unit according to claim 11, wherein one of the at least one exposed portion is in the additional predetermined region, and covers at least an area outside of an edge of the seal member.

13. The base unit according to claim 10, wherein the at least one exposed portion extends from an area radially inside of the region of contact to an area radially outside of the region of contact.

14. A base unit for use in a disk drive apparatus and to be attached to a cover portion to define an enclosed space to be filled with a gas having a density lower than that of air, the base unit comprising:
a base portion that extends radially and supports a motor capable of rotating about a central axis extending in a vertical direction; and
a lateral wall portion that extends axially upward from an edge portion of the base portion; wherein
the base portion includes:
a part accommodating portion defined by a through hole arranged to pass through the base portion in an axial direction, and arranged to accommodate at least a portion of a predetermined part; and
a seal member that closes an end portion of the through hole on one axial side;
the base portion and the lateral wall portion include:
a base made of a metal;
a coating portion formed by electrocoating a surface of the base with at least a resin; and
at least one exposed portion where the surface of the base is exposed;
the at least one exposed portion is in a predetermined region lying on an outer surface of the base portion, and extends outward from an edge of the part accommodating portion to have a predetermined width;
the coating portion and the at least one exposed portion are arranged in the through hole;

a gasket is held between an axially upper end surface of the lateral wall portion and an axially lower surface of the cover portion; and one of the at least one exposed portion is provided in an additional predetermined region lying on an axially upper end portion of the lateral wall portion, and covers an area radially outside of a region of contact between the gasket and the lateral wall portion.

15. The base unit according to claim 14, wherein the exposed portion in the additional predetermined region extends from an area radially inside of the region of contact to an area radially outside of the region of contact.

16. The base unit according to claim 14, wherein one of the at least one exposed portion covers at least an area outside of an edge of the seal member.

* * * * *